United States Patent Office 2,729,839
Patented Jan. 10, 1956

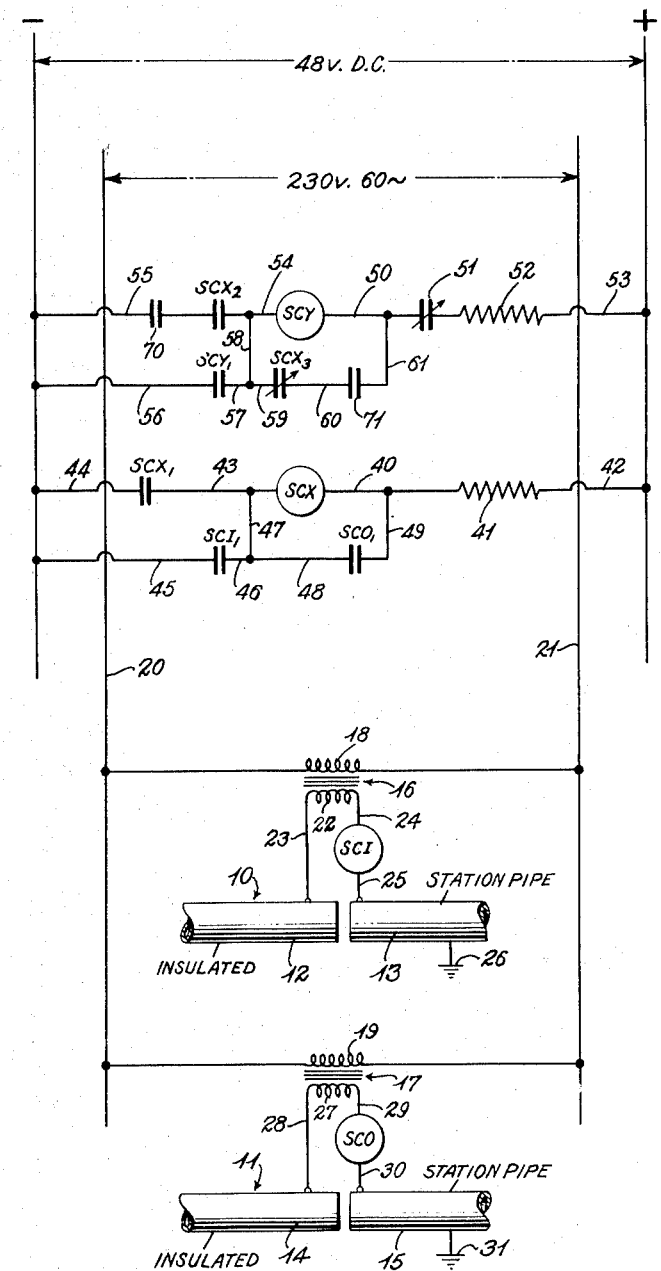

2,729,839

SCRAPER DETECTOR

William W. Holt, Jr., Atlanta, Ga., assignor to Plantation Pipe Line Company, a corporation of Delaware Application November 23, 1954, Serial No. 470,582

6 Claims. (Cl. 15—104.06)

This invention relates to a pipe line scraper detector and in combination therewith to a means responsive to actuation of the detector for controlling the operation of a pumping station.

Heretofore in this art, the need for a pipe line scraper signaling device has been the subject of some previous development. It will be appreciated that in the operation of a pipe line, it is well known that scrapers are passed through crude oil and product pipe lines at intervals for the purpose of removing sediment and scale from the inside walls of the pipe. The removal of sediment and scale is highly advantageous and desirable in maintaining the capacity of the pipe line at maximum level. A typical procedure for scraping a crude oil pipe line contemplates placing a scraper into the line, for example at a first pump station, and after the scraper has travelled to and reached the second pump station, to shut down the pumps at the second station in time to prevent the sediment and scale scraped from the line from passing through the pumps. An accepted procedure is to open a bypass valve or the like on the upstream side of the No. 2 station in order to remove the scraped sediment and scale from the line as well as the scraper. Thereafter, the scraper is reintroduced into the line on the downstream side of the No. 2 station and passed to the next pump station where the procedure is repeated.

The difficulties which have been encountered in this operation stemmed originally from the lack of any indicating system to inform the operator of the station to which the scraper was travelling, as to its location during transit, or the time when it arrived close to the receiving station so that the operator would have sufficient time to shut down the pumps. In recent years, there have been a number of developments regarding indicators and signaling systems to apprise the operator of the station to which the scraper is travelling, of the arrival of the scraper at a certain point in the line near the pumping station. Examples of such developments can be found in Patent No. 2,371,251, issued March 13, 1945; Patent No. 2,570,951, issued October 9, 1951; and Patent No. 2,601,249, issued June 24, 1952.

In all such developments, however, the apparatus merely operated to provide the operator of the control station with the knowledge that the scraper had reached or passed a certain point in the pipe line. Reliance has still been placed on the operator of the control station for taking the necessary steps of shutting down the pumps and of opening the valves to the bypass line, etc.

It is the principal object of the present invention to provide a scraper detector mechanism which, when actuated, will in turn actuate a control means for the pump station to which the scraper is travelling, which control means will function to shut down the pumps of the control station, open the bypass valve, etc. and condition itself for restarting the pumps when the scraper has been removed from the line and reintroduced on the downstream side of the pump station. When the scraper has passed a predetermined point on the downstream side of the pump station, it will again actuate the detecting mechanism which, in turn, will actuate the control means for restarting the pumps in the station and also condition itself to shut down the pump station upon the arrival of a second scraper. It is a further feature of the present invention that the control means is constructed and arranged so that if the particular pump station has been shut down for repair at the time of arrival of the scraper, the control means will not function to restart the station. Also, if the station has been shut down responsive to some other protective device, the control means will not reactivate the station.

It is another object of the present invention to provide a simplified detecting and control means for the purposes of this invention which will operate efficiently and economically.

Further objects and advantages of the present invention will become more fully apparent from a detailed consideration of the following description when taken in conjunction with the drawing in which the sole figure of the drawing is a schematic representation of the detecting means and control means of the present invention.

Referring now to the drawing, there will now be described in detail the preferred embodiment of the invention. A pipe line generally designated by the numeral 10 represents the pipe line leading to a pump station and thus constitutes in effect the pipe line on the upstream side of the pump station. A pipe line 11 represents the line leading from the pump station and thus constitutes in effect the line on the downstream side of the pump station. The pipe line 10 at a preselected point near the pump station is arranged with an insulated spool or section 12 which is inserted into the pipe line and electrically insulated therefrom in a manner well known in the art. For this purpose, it is believed customary to employ rubber gaskets at either end of the insulated section 12 to insulate same from the remainder of the pipe line. The line connecting the insulated section 12 with the pump station is identified in the drawing by the legend station pipe and is assigned numeral 13. The pipe line 11 is likewise arranged with an insulated spool or section 14. The portion of pipe line 11 connecting the insulated section 14 with the pump station is identified in the drawing by the legend station pipe and is assigned numeral 15. Two transformers 16 and 17, provided with primary windings 18 and 19 respectively, are connected to a 230 volt, 60 cycle source of electrical power by means of leads 20 and 21. The secondary winding 22 of transformer 16 is connected on one side by means of lead 23 to the insulated section 12. On its other side, the winding 22 is connected by means of lead 24 to a relay SCI with the other side of the relay being connected by lead 25 to the station side of pipe line 10 or in other words section 13. The section 13 is grounded as indicated at 26.

The secondary winding 27 of the transformer 17 is connected on one side by means of lead 28 to the insulated section 14 and on its other side by means of lead 29 to a relay SCO. The other side of relay SCO is connected by means of lead 30 to the pipe section 15 on the station side downstream of the station. Section 15 is grounded as indicated at 31.

The transformers 16 and 17 are characterized by a 10:1 step down ratio whereby the voltage source, considered as 220 volts, is stepped down to 22 volts in the secondary windings 22 and 27 of the transformers 16 and 17 respectively. The relays SCI and SCO are 22 volt A. C. relays. As will be apparent, these two secondary circuits are normally open and remain so until such time as a scraper passing through either of the pipe lines 10 and 11 bridges the insulated section 12 and the section 13 in the case of pipe line 10 and the insulated section 14 and the section 15 in the case of pipe line 11 at which time the circuit will be completed and the particular relay actuated.

What has been described thus far constitutes in effect the detecting means for determining the arrival of a scraper to a position where it bridges one of the insulated sections and its respective section 13 or 15. Upon detection of the arrival of a scraper as reflected by actuation of one of the relays SCI and SCO, there is actuated a control means which functions to control the operation of the pumps in the station and the bypass valves as well as other apparatus. The control means is composed of a 48 volt direct current circuit and includes a relay SCX connected by means of lead 40 to one side of a current limiting 75 ohm resistor 41 and a lead 42 connecting the other side of the resistor 41 with one side of the control circuit. The other side of relay SCX is connected by means of lead 43 to one side of normally open contacts $SCX_1$ and lead 44 which connects the other side of the normally open contacts $SCX_1$ to the other side of the control circuit. Connected in parallel with normally open contacts $SCX_1$ are normally open contacts $SCI_1$ by means of leads 45, 46 and 47, the latter being joined to lead 43. Additionally, normally open contacts $SCO_1$ are connected in parallel with relay SCX by means of leads 48 and 49, the latter of which joins with lead 40.

Also provided in the control circuit is a relay SCY which is connected on one side to one side of the control circuit by means of lead 50, normally closed contacts 51, a current limiting 200 ohm resistor 52 and lead 53. Relay SCY is connected on its other side to the other side of the control circuit by means of lead 54, normally open contacts $SCX_2$, normally open contacts 70, and lead 55. Connected in parallel with normally open contacts $SCX_2$ and 70 are normally open contacts $SCY_1$ by means of leads 56, 57 and 58, the latter lead being joined with lead 54. Connected in parallel with the relay SCY are normally closed contacts $SCX_3$ and normally open contacts 71 by means of leads 59, 60 and 61, the latter lead being connected with lead 50.

The operation of relay SCY controls the operation of the pumps and drive motors of the station and the operation of relay SCX controls the pump station by pass valves.

Before discussing the sequence of operations of the apparatus, there are several important considerations to be appreciated. Generally there are two systems employed for a pump station, namely, a single unit pumping system and a plural unit pumping system. In a single unit pumping system, there is, as the name implies, only one pump. In this system the bypass arrangement for the station is provided by a line extending from the suction side of the sole pump to the discharge side of the pump with a suitable bypass valve interposed in this line. In a plural unit pumping system, however, two or more pumps are utilized arranged in both series or parallel, or both. In this type of system, the bypass is usually constituted by a line extending from the suction side of the station to the discharge side of the station with a suitable bypass valve interposed in the line. The present invention is of utility and performs equally well with both types of systems.

The contacts 70 and 71 are provided in the circuit as a safety measure to prevent activation of the station units when a scraper passes through when the station was not in operation upon the arrival of a scraper, as for example, if the station has been shut down for repairs. Thus, the contacts 70 and 71 are manually or automatically closed and kept closed during the time the station is in operation and are kept open during the time the station is shut down for any purpose. The contacts 51 are maintained normally closed and are opened responsive to the actuation of some protective device, as for example, an overload safety device for the pump motors. The contacts 51 hence serve to prevent reactivation of the station after it has been automatically shut down by some other protective device. In all circumstances of station shut down it will be realized that the bypass valve or valves for the station must be maintained open. This is conveniently accomplished through the agency of a suitable means which will function to this end and the operation of which will not be affected by the control circuit.

The sequence of operations of the apparatus of the present invention will now be described with reference to a pump station in operation. Under these circumstances, the contacts 70, 71 and 51 are closed. When a scraper bridges the insulated section or spool 12 and the grounded pipe section 13, the secondary circuit of the transformer 16 is closed and current flows therethrough resulting in the relay SCI being energized causing contacts $SCI_1$ to close. This permits a flow of current in the control circuit through the lead 45, the now closed contacts $SCI_1$, lead 46, lead 47, relay SCX, lead 40, resistor 41, and lead 42 since the enumerated means provide a completed circuit, and thus, the relay SCX is energized. The relay SCX, when energized, causes the closing of contacts $SCX_1$ and $SCX_2$ and the opening of contacts $SCX_3$. At this moment, the circuit through relay SCX will remain completed through the now closed contacts $SCX_1$ even though the scraper is removed from bridging the insulated section 12 and the pipe section 13 which causes relay SCI to become de-energized thus opening contacts $SCI_1$. In addition, energization of relay SCX closes contacts $SCX_2$ and opens contacts $SCX_3$. At this time, a current path is completed through relay SCY through now closed contacts 51, $SCX_2$ and 70 resulting in relay SCY becoming energized and closing contacts $SCY_1$. The relay SCX either directly opens the bypass valve of the pump station or indirectly opens the bypass valve by operating any suitable electrical, mechanical, or hydraulic mechanism associated with the bypass valve for this purpose. At substantially the same time the relay SCY either directly cuts off the station units (pumps and motors) or indirectly cuts them off by operating any suitable electrical, mechanical, or hydraulic mechanism associated with the station units for this purpose.

The scraper by this time has passed the point at which it bridged the sections 12 and 13 and thus relay SCI is de-energized causing contacts $SCI_1$ to open. This does not affect the relay SCX since the circuit remains completed through contacts $SCX_1$. The scraper then enters the pump station and passes through the bypass line and emerges on the downstream side of the station. Eventually the scraper arrives at a point on the downstream side of the station where it bridges the insulated section or spool 14 and the grounded section 15. When this occurs, the circuit in the secondary of the transformer 17 will be completed and current will flow. The passage of current through relay SCO energizes same resulting in normally open contacts $SCO_1$ being closed. The closing of contacts $SCO_1$ provides a shunt around the relay SCX resulting in the de-energization of same. Upon being de-energized, the relay SCX closes the bypass valve and in addition causes the contacts $SCX_1$ and $SCX_2$ to open and the contacts $SCX_3$ to close. At this time the portion of the circuit including relay SCX has been fully restored to its initial condition ready for the arrival of the second scraper. The closing of contacts $SCX_3$ provides a shunt around the relay SCY thereby de-energizing same and resulting in contacts $SCY_1$ being opened. De-energization of relay SCY further restarts or reactivates the units (pumps and motors) of the pump station returning them to service. At this time the portion of the circuit including relay SCY has likewise been fully restored to its initial condition.

In the event the particular station is shut down at the time of arrival of a scraper, the contacts 70 and 71 will be open thereby preventing activation of the station units when a scraper passes through the station, if the shut down is intentional, or the contacts 51 will be open preventing activation of the units, if the shut down is responsive to some protective safety device.

As is evident from the above discussion the apparatus of this invention is capable of operating in a fully automatic manner and hence can be used on remote controlled unattended pumping stations.

Although the present invention has been shown and described in a single preferred embodiment with specific values given for certain elements and specific circuitry, the same is not to be construed as limiting. Accordingly, it is intended that the following claims include such changes and modifications as are obvious to persons skilled in this art or which do not depart from the spirit, scope and contemplation of the present invention.

What is claimed is:

1. In combination a pump station including pumping units and a bypass line having a bypass valve interposed therein, a first pipe line connected to the suction side of said pump station and defining a first insulated pipe section, a second pipe line connected to the discharge side of said pump station and defining a second insulated pipe section, a scraper capable of conducting electricity positioned in said pipe line and movable therethrough, a first detecting means, means responsive to the arrival of said scraper in bridging relation with said first insulated section and said first pipe line for actuating said first detecting means, a second detecting means, means responsive to arrival of said scraper in bridging relation with said second insulated section and said second pipe line for actuating said second detecting means, a control means for controlling the operation of said pumping units and said bypass valve, means responsive to actuation of said first detecting means for affecting said control means to open said bypass valve and shut down said pumping units, and means responsive to actuation of said second detecting means for affecting said control means to close said bypass valves and restart said pumping units.

2. The combination as recited in claim 1 wherein each said detecting means includes a relay.

3. The combination as recited in claim 1 wherein each said detecting means is characterized by a detecting circuit which includes in series a relay, circuit means connecting one side of said relay with the respective insulated section, circuit means connecting the other side of said relay with the respective pipe line, and a source of electrical power.

4. The combination as recited in claim 1 wherein said control means is constituted by a first means for controlling the operation of said bypass valve and a second means for controlling the operation of said pumping units.

5. The combination as recited in claim 4 wherein said detecting means selectively affect said first means of said control means and means are provided responsive to affection of said first means for affecting said second means of said control means.

6. In combination a pump station including a pumping unit and a bypass line having a valve interposed therein, a first pipeline defining an insulated section connected to the upstream side of said pump station, a second pipeline defining an insulated section connected to the downstream side of the pump station, a scraper capable of conducting electricity positioned in said pipeline and movable therethrough, electrical means responsive to arrival of said scraper in bridging relation with said first insulated section and said first pipeline to stop said pump unit and open said valve, and electrical means responsive to arrival of said scraper in bridging relation with said second insulated section and said second pipeline to start said pump and close said valve.

References Cited in the file of this patent

UNITED STATES PATENTS

| | | |
|---|---|---|
| 1,102,323 | Collins | July 7, 1914 |
| 2,570,951 | Hugo et al. | Oct. 9, 1951 |
| 2,685,685 | Lathrop et al. | Aug. 3, 1954 |